Jan. 15, 1946.   L. R. BIGGS ET AL   2,393,137
EXPANSION JOINT ARRANGEMENT
Filed July 21, 1943   2 Sheets-Sheet 1
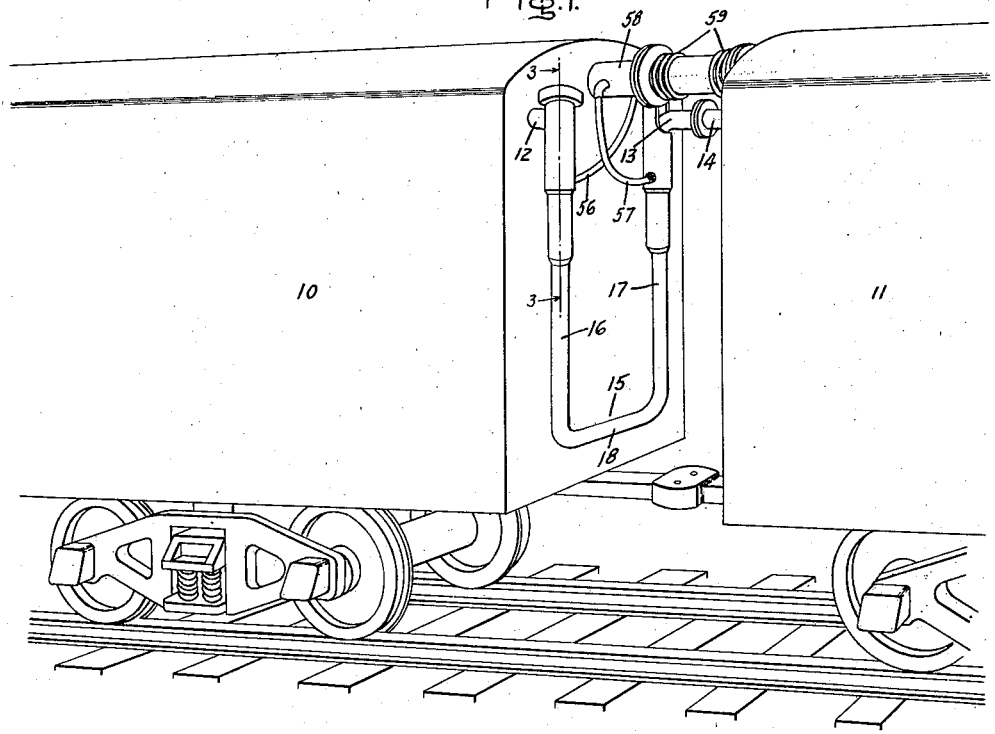
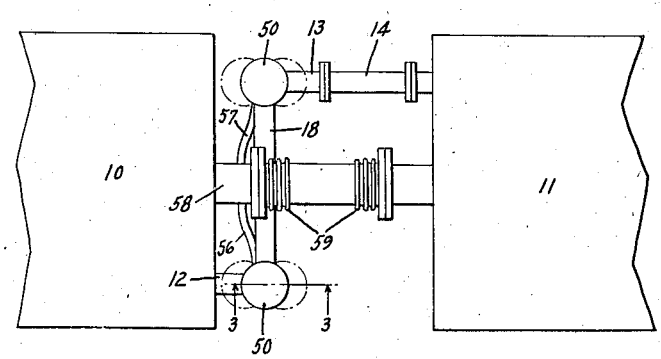
Inventors:
Leonard R. Biggs,
William J. Zimola,
by Harry E. Dunham
Their Attorney.

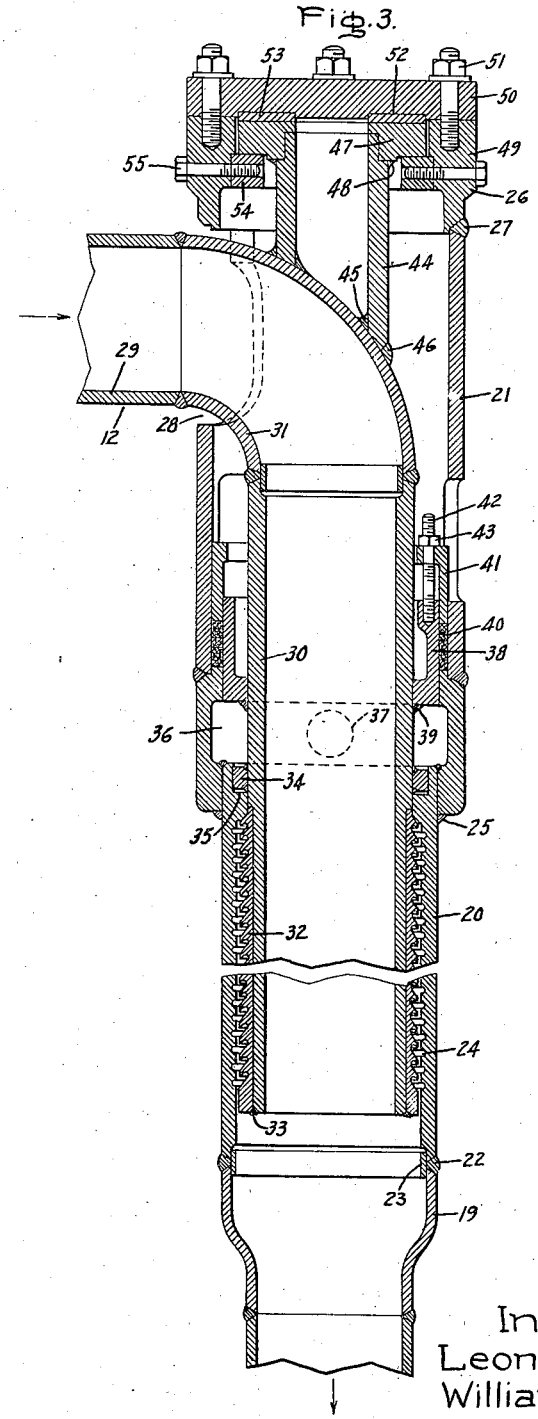

Patented Jan. 15, 1946

2,393,137

UNITED STATES PATENT OFFICE 2,393,137

EXPANSION JOINT ARRANGEMENT

Leonard R. Biggs, Schenectady, and William J. Zimola, Scotia, N. Y., assignors to General Electric Company, a corporation of New York Application July 21, 1943, Serial No. 495,646

5 Claims. (Cl. 285—9)

The present invention relates to expansion joint arrangements such as are used for connecting sections of steam pipes and conduits subject to expansion during operation. The invention is of particular importance in arrangements in which space is limited, thus precluding the provision of ordinary bellows type connecting means.

The object of our invention is to provide an improved construction and arrangement of expansion joints, permitting considerable relative movement between two conduit sections connected by such a joint. This is accomplished in accordance with our invention by arranging two parallel spaced conduit sections out of alignment and connecting them by a U-shaped swing joint with legs sealed to and having bearing supports on the respective sections. Each conduit section according to our invention has a portion projecting into a leg of the swing joint and sealed thereto by suitable labyrinth packing means.

For a better understanding of what we believe to be novel and our invention, attention is directed to the following description and the claims appended thereto in connection with the accompanying drawings.

In the drawings Fig. 1 illustrates a joint arrangement embodying our invention; Fig. 2 is a top view of a part of Fig. 1; and Fig. 3 is an enlarged sectional detail view along line 3—3 of Fig. 1 and line 3—3 of Fig. 2.

In the example illustrated in the drawings the joint arrangement according to our invention forms part of a movable power plant requiring two railroad cars for transportation, one car carrying an elastic fluid generator and another car carrying an elastic fluid consumer such as a turbine for receiving elastic fluid from the generator. Thus, in the drawings we have indicated a first car 10 which includes elastic fluid generating means and a second car 11 which includes an elastic fluid consumer or turbine. The two cars, more specifically the elastic fluid generator and the elastic fluid consumer, are connected by conduit means to conduct elastic fluid from the generator to the consumer. This conduit means includes a conduit section 12 connected to the car 10 and a conduit section 13 connected to the car 11 by means of a detachable flanged conduit portion 14 (Fig. 2). The two conduit sections 12 and 13 are subject to considerable axial expansion during operation. To permit such expansion the conduit sections 12 and 13 are arranged in parallel spaced relationship and have their ends connected by a swing joint 15. The swing joint 15 is in the form of a U-shaped conduit having two legs 16, 17 connected at their lower ends by a base 18 and connected at their upper ends to the conduit sections 12 and 13 respectively. Each leg 16, 17, as shown in Fig. 3, comprises a lower portion 19, an intermediate portion 20, and an upper portion 21. The intermediate conduit portion 20 is fused to the lower portion 19 by a weld 22 against a backing ring 23. The inner surface of the intermediate portion 20 forms a plurality of spaced annular packing grooves 24. The upper portion 21 has a lower end fused to the upper end of the intermediate portion 20 by a weld 25. The upper end of the portion 21 is attached to a top 26 by means of a weld 27.

The top 26 and the conduit portion 21 together form an opening 28 for receiving a conduit section (section 12 in Fig. 3) to which the leg is to be connected. The conduit section is angular and has three parts, a longitudinal part 29 outside the swing joint, a vertical or depending part 30 concentrically disposed within the leg of the swing joint, and an elbow 31 connecting the parts 29 and 30. The part 30 concentrically disposed within the leg is sealed thereto by suitable packing means. In the present example a labyrinth type packing sleeve 32 forming a plurality of annular grooves and inclined teeth between them is attached to the part 30 and fused thereto by means of a weld 33 at its lower end. The teeth between the grooves of the sleeve 32 cooperate with the grooves 24 of the lower conduit part 20 to form therewith a labyrinth type packing. Vertical upward movement of the U-shaped conduit relative to the conduit part 30 is limited by means of a stop ring 34 welded to the conduit 30 and closely spaced with a shoulder 35 formed on the intermediate conduit part 20.

During operation some steam or other fluid passing through the joint may leak along the labyrinth type packing. The leakage fluid is collected in an annular chamber 36 having a drain opening 37 and being formed between the upper conduit part 20 and the conduit part 30. To reduce leakage from the chamber 36 in upward direction towards the opening 28, additional sealing means are formed at the upper end of the chamber 36. These additional sealing means in the present example are in the form of a cylinder 38 fused to the conduit part 30 by a weld 39 and forming together with the outer upper conduit part 21 a packing chamber for receiving a plurality of packing rings 40 held in position and compressed by means of a flanged cylinder 41 attached to the cylinder 38 by a plurality of stay bolts 42 and nuts 43.

The swing joint is vertically supported on the conduit sections 12, 13. To this end each conduit section is provided with a tubular supporting member 44 fused to the elbow part 31 by inner and outer welds 45, 46 respectively. A thrust bearing ring 47 is rabbeted to the upper end of the tubular supporting member 44 and permanently secured thereto by a weld 48. The top 26 has a cylindrical portion 49 fused to the conduit part 29 by the aforementioned weld 27. In addition the top has a cover plate 50 secured to the cylindrical portion 49 by a plurality of bolts 51. The inner surface of the top 50 forms an annular groove 52 for accommodating a bearing ring 53 preferably made of bronze and having bearing contact with the thrust bearing ring 47. To reduce upward movement a segmental ring 54 is provided below and forming close clearance with the thrust bearing ring 47. The segments of the ring 54 are attached to the cylindrical portion 49 of the top 26 by a plurality of bolts 55. Thus, the stationary conduit sections are provided with thrust bearing means for vertically supporting the U-shaped conduit of the swing joint. The segmental ring 54 and the aforementioned ring 34 constitute stops, limiting upward movement of the U-shaped conduit of the swing joint, leaving said U-shaped conduit free to expand downward.

The openings 37 of the leakage chambers 36 of the two legs are connected by flexible pipes 56, 57 to a low pressure, low temperature conduit 58 connected between the two cars 10, 11 and including a bellows type flanged joint 59. During operation leakage fluid passing along the labyrinth type packing means is thus drained from the openings 37 into the low pressure conduit 58 which latter may serve to conduit low temperature fluid or condensate from the car 11 to the car 10. Variations in temperature cause the U-shaped conduit of the swing joint to swing about the vertical center-line through the base 18, upon increase in temperature the leg 16 moving towards the car 11 while the leg 17 moves towards car 10, that is, away from car 11. In Fig. 2 the leg 18 and the tops 50 are indicated in full line in an intermediate position and in dotted lines in their end positions.

Ordinarily it is not desirable to operate the movable power plant during movement of the cars 10, 11. During such movement it is desirable to disconnect the conduits between the cars. This may be accomplished by removing the detachable flanged part 14 from the conduit section 13 and supporting the entire swing joint on the car 10. The conduit 58 may be readily disconnected by detaching the flanged bellows type joint 59 therefrom.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent of the United States is:

1. Expansion joint arrangement comprising two angular conduit sections having parallel spaced portions, and swing type joint means connecting the sections including a U-shaped conduit having legs concentrically surrounding the respective conduit portions, labyrinth packing means sealing the legs to the conduit portions, bearing supporting means secured to the conduit sections, and bearing means supporting the U-shaped conduit on the supporting means at points substantially spaced from the fluid path through the conduit sections and permitting relative rotation between the respective legs and conduit portions.

2. Expansion joint arrangement comprising two angular conduit sections having parallel spaced portions, and means connecting the portions comprising a U-shaped conduit having legs concentric with the respective portions, labyrinth type packing means between each leg and the conduit portion associated therewith, an annular chamber formed between each leg and the respective conduit portion to receive leakage fluid passing along the packing, bearing supporting means secured to each conduit section, and thrust bearing means between each leg and conduit portion to support the U-shaped conduit on the supporting means at points considerably spaced from the fluid path through the conduit sections to reduce heat transfer from the fluid path to the bearing means.

3. Expansion joint arrangement comprising two parallel spaced, horizontally disposed conduit sections, each section having an end portion with an elbow and a vertical conduit part depending therefrom, and conduit means connecting said conduit parts and permitting relative movement between them comprising a U-shaped conduit having a base extending substantially transverse to the conduit sections and two legs, each leg having an opening for accommodating the elbow, the vertical conduit parts being concentrically disposed within the respective legs, labyrinth sealing means between the legs and said conduit parts, a thrust bearing support secured to each elbow in alignment with the respective conduit parts, and means including a top attached to the upper end of each leg and held on and having a bearing surface engaging the thrust bearing support at points considerably spaced from the fluid path through the conduit sections.

4. Expansion joint arrangement comprising two horizontally extending conduits with vertical end portions, a U-shaped conduit having legs concentric with and depending from the respective vertical end portions, packing means sealing the legs to the end portions, a thrust bearing on each end portion located vertically above the conduits, and an extension on each leg supported on one of the thrust bearings.

5. In a high pressure, high temperature elastic fluid power plant, an expansion joint arrangement comprising two high pressure conduits disposed in the same plane or in parallel planes and having spaced parallel end portions arranged at right angles to the planes of the conduits, a swing type connection between said end portions including a U-shaped conduit having spaced parallel legs in telescopic relation with the respective end portions of the conduits, a thrust bearing means supported on and spaced substantially from each high pressure conduit and arranged to support a leg of the U-shaped conduit, and sealing means between each leg of the U-shaped conduit and the related conduit end portion, each sealing means including a high pressure labyrinth type packing, walls associated with the leg and defining an annular leak-off chamber surrounding the conduit end portion at the low pressure side of the labyrinth packing, low pressure packing means between the leg and the conduit end portion and arranged to prevent leakage from the leak-off chamber to ambient atmosphere, and conduit means connecting the leak-off chamber to a part of the power plant which is during operation maintained at an intermediate pressure between ambient pressure and the pressure in the high pressure conduits.

LEONARD R. BIGGS.
WILLIAM J. ZIMOLA.